May 22, 1962 C. G. LONG 3,035,950
REINFORCED GELLED PROPELLANTS
Filed Feb. 27, 1959 2 Sheets-Sheet 1

INVENTOR.
C. G. LONG
BY Hudson & Young
ATTORNEYS

May 22, 1962  C. G. LONG  3,035,950
REINFORCED GELLED PROPELLANTS
Filed Feb. 27, 1959  2 Sheets-Sheet 2

INVENTOR.
C.G. LONG
BY
ATTORNEYS

United States Patent Office 3,035,950
Patented May 22, 1962

3,035,950
REINFORCED GELLED PROPELLANTS
Claude G. Long, Bartlesville, Okla., assignor to Phillips Petroleum Company, a corporation of Delaware
Filed Feb. 27, 1959, Ser. No. 796,169
16 Claims. (Cl. 149—38)

This invention relates to a new type of gas generating propellants, which I call gelled propellants. In one aspect it relates to gelled propellants reinforced by solid structural material. In another aspect it relates to a composition of matter comprising reinforced gelled propellants and their use in a manner analogous to solid propellants. In still another aspect it relates to gelled propellant compositions, a method for their production, their reinforcement structurally, and their use in rockets in a manner analogous to solid propellants.

One of the advantages for the use of solid propellants over liquid propellants is that fuel injectors, leakproof tanks, pumps, pipes or tubes, meters and complicated controls are not required. Such items contribute to the dead weight of a rocket and are the source of operational difficulties. Solid propellants which have met with widespread application are those of the composite type which comprise one or more solid oxidizers uniformly dispersed in a rubbery binder. In the preparation of these composite propellants it has not been generally feasible to utilize a major amount of any one liquid component unless the liquid could be converted to a solid. For example, minor amounts of liquid plasticizers have been used with rubbery polymers, and thermosetting or curable liquid polymers have been used in the preparation of binders with solid oxidizers. Thus, many potentially valuable liquid propellant ingredients cannot be readily employed as the major ingredient of a composite propellant or used in a manner analogous to solid propellants.

An object of this invention is to provide a propellant gel produced from high energy liquid fuels and oxidizers.

Another object of this invention is to provide a propellant gel produced from high energy liquid fuels which can be used in a manner analogous to solid propellants.

Another object of this invention is to provide a propellant gel produced from high energy liquid fuels and supported mechanically in such a manner that the propellant can be used in a manner analogous to solid propellants.

Still another object of this invention is to provide a method for production of such a propellant.

Other objects and advantages of this invention will be realized by those skilled in the art upon reading the following description in conjunction with the attached drawing.

Figure 1:
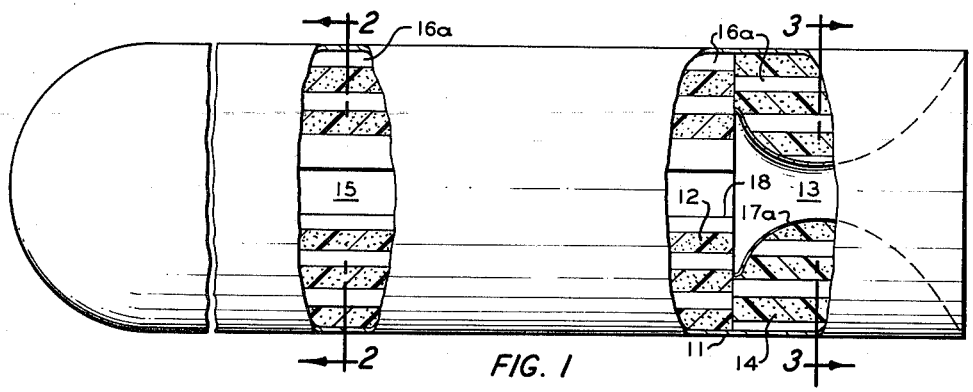
FIGURE 1 is a longitudinal view, partly in section, illustrating use of a cell supported, gelled propellant as the propellant of a rocket.

This invention relates to a process wherein liquid propellant ingredients are used in major proportions in the compositions. The liquid ingredients are gelled or otherwise converted to a viscous mass. However, such gelled compositions may, under some pressure differential conditions, flow, so that, by themselves, they cannot always be employed in the manner of solid propellants. However, when such gelled compositions are encased in combustible nonmetallic and metallic cellular structures as herein described, the gelled compositions can be used in the same manner as solid propellants. The combustible cellular structures serve as additional fuel and thereby improve the utility of the gel, i.e., increase the burning rate and increase the specific impulse of the propellant.

By the terms "gel propellant," "gelled propellant," or "propellant gel" is meant a propellant composition prepared with a major amount of one or more liquid ingredients which are mixed with a minor amount of one or more reagents to effect gelation of the liquid or liquids. Specifically, the terms "gel propellant," "gelled propellant," or "propellant gel" refer to a composition prepared by mixing together a liquid oxidizer, such as tetranitromethane, and a solid, high molecular weight polymeric fuel, such as a poly alkyl vinyl ether, and a crosslinked poly methyl vinyl ether, the fuel being soluble, dispersible or swellable in the tetranitromethane, to form a gel.

These gel propellants are organogel systems which exhibit flow only upon the influence of a finite force.

These gel propellants are organogel systems which exhibit flow only upon the influence of a finite force.

This invention further relates to preparation of gel propellants with other nitroalkanes than tetranitromethane. Tetranitromethane, that is, TNM, is used herein in an exemplary manner. TNM has a melting point of about 13° C. and a boiling point of about 126° C. This compound is thus a liquid at temperatures commonly encountered in the use of propellants. Specifically, tetranitromethane, alone and in admixture with other nitroalkanes and/or propellant modifiers, is converted to a gel when mixed with polymers and particularly with those polymers which have been crosslinked by treatment with a peroxide or other means.

In the practice of my invention, I use tetranitromethane alone as an oxidant, or in admixture with one or more other nitroalkanes. The nitroalkanes which I use have one to four, inclusive, carbon atoms per molecule, and one or more nitro groups in the molecule. Examples of the nitroalkanes which I use, in addition to tetranitromethane, are nitromethane, dinitromethane, trinitromethane, mononitroethane, 1,2-dinitroethane, 1,1-dinitroethane, 1,1,2-trinitroethane, 1,1,2,2-tetranitroethane, pentanitroethane, hexanitroethane, 1-nitropropane, 2-nitropropane, 1,3-dinitropropane, 1,1,1-trinitropropane, 1,1,2,2,3,3-hexanitropropane, octanitropropane, 1,4-dinitrobutane, 1,2,4-trinitrobutane, 1,2,3,4-tetranitrobutane, 1,1,2,2,3,3,4,4-octanitrobutane, and decanitrobutane. I also use mixtures of any two or more of the above-mentioned nitroalkanes in preparation of the propellant compositions of this invention.

I frequently use propellant modifiers in my propellant compositions. Modifiers, when used, are used in amounts usually less than about 25 percent by weight of the propellant. As examples of modifiers, I use nitrogen tetroxide ($N_2O_4$) for lowering the freezing point of the nitroalkane, for example, the tetranitromethane. I use acetophenone to reduce the vapor pressure of the propellant. I use metal powders as supplementary high energy fuels to increase the specific impulse of the propellant composition. Preferred powdered metals are aluminum, boron, magnesium, and alloys of any two or more of these metals, such as alloys of aluminum with magnesium, aluminum with boron, aluminum with manganese, aluminum with zinc and aluminum with copper. I also use catalysts, frequently called burning rate catalysts, to increase the propellant burning rate. Suitable burning rate catalysts include ammonium dichromate and metal ferrocyanides and ferricyanides. The metal ferrocyanides include such ferric ferrocyanides as Prussian blue, Berlin blue, Hamburg blue, Chinese blue, Paris blue and Milori blue, and soluble ferric ferrocyanide, such as soluble Berlin blue or soluble Prussian blue, which contains potassium ferric ferrocyanide, and ferric ferrocyanide which has been treated with ammonia. I also use such compounds of nickel and of copper as nickel chromite, nickel oxide, powdered nickel, copper chromite, cuprous oxide, cupric oxide, and even powdered copper metal as catalysts for increasing the burning rate of the propellants.

I use polymers to cause gelation of the nitroalkane, such as tetranitromethane or mixtures of this compound with one or more of the other aforementioned nitroalkanes. The polymers which I use are homopolymers, and copolymers prepared from vinyl ethers. Vinyl ethers are represented by the generic formula $ROCH=CH_2$, in which R is an alkyl group containing from 1 to 4 carbon atoms per alkyl group. Such alkyl vinyl ethers which I use include methyl vinyl ether, ethyl vinyl ether, propyl vinyl ether, isopropyl vinyl ether, n-butyl vinyl ether, tertiary-butyl vinyl ether and isobutyl vinyl ether. Broadly, the alkyl groups of these vinyl ethers contain from 1 to 4 carbon atoms per alkyl group. The homopolymers of these vinyl ethers are represented by molecules having the units $$\left[ \begin{array}{c} -CH_2-CH- \\ | \\ OR \end{array} \right]_n$$

in which the number of units "$n$" in the polymer molecule is at least 3, and preferably at least 10. This number, in some cases, is very large, for example 35,000, and when very large it represents polymer molecular weights on the order of 100,000 to 2,000,000, and even greater. These polymers are sometimes characterized by their viscosity range, as in terms of their specific viscosity which is determined by dissolving the polymer in a solvent (sometimes I use benzene or toluene as the solvent) and measuring the viscosity of the solution and the viscosity of the solvent, at 25° C. with a capillary viscosimeter. The time of flow of the solution $T_2$ and the time of flow of the solvent $T_1$ are used to obtain the specific viscosity, $N_{sp}$, according to the equation

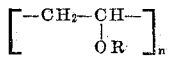

$$N_{sp} = \frac{T_2}{T_1} - 1$$

Polymers which I use in the practice of this invention have specific viscosities in the range of 0.3 to 1.5.

One or more of the above-disclosed vinyl ether monomers are, when desired, copolymerized in bulk, emulsion or in solution with one or more copolymerizable monomers such as vinyl chloride, vinyl acetate, 1,3-butadiene, acrylonitrile, and such acrylic esters as methyl acrylate and ethyl acrylate. The polymers which I use are prepared by copolymerization of 75 to 100 parts of the vinyl ether monomers with 25 to 0 parts of the copolymerizable monomers (vinyl chloride, vinyl acetate, acrylonitrile, methyl acrylate and ethyl acrylate), by weight.

Examples of polymers of vinyl ethers which I use are poly methyl vinyl ether, poly ethyl vinyl ether, poly propyl vinyl ether, poly isopropyl vinyl ether, poly n-butyl vinyl ether, poly tertiary-butyl vinyl ether, poly isobutyl vinyl ether, a copolymer of methyl vinyl ether and 1,3-butadiene, a copolymer of ethyl vinyl ether and acrylonitrile, and a copolymer of n-butyl vinyl ether with methyl acrylate. In specific cases I use a copolymer of 95 parts methyl vinyl ether and 5 parts 1,3-butadiene, a copolymer of 90 parts methyl vinyl ether and 10 parts acrylonitrile, and a copolymer of 80 parts n-butyl vinyl ether and 20 parts methyl acrylate, all these parts being by weight.

Near stoichiometric solutions of tetranitromethane and benzene or toluene are extremely brisant explosives; therefore this nitroalkane cannot be used safely as an oxidant in admixture with many hydrocarbons.

In one embodiment tetranitromethane (TNM) is gelled by use of a polymer of a vinyl methyl ether which has been crosslinked by treatment with a peroxide. By the term "crosslinking" is meant a joining of polymer molecules at other points of the molecules than end carbon atoms. The crosslinking of the polymers with a peroxide increases their effectiveness as gelling agents. The crosslinking is carried out by dissolving viscous or solid polymer in an inert solvent such as benzene, toluene or xylene, and mixing a peroxide, such as dicumyl peroxide, lauroyl peroxide, benzoyl peroxide or butyl peroxide into the solution. The peroxide added and mixed with the solution is employed in amounts of about 1 to 10 percent by weight of the polymer. After mixing of the peroxide with the polymer solution, the mixture is heated to a temperature between 50° and 200° C. under sufficient pressure to maintain substantially all of the reaction mixture in the liquid phase. The solvent is then flash vaporized, and recovered, if desired. In one case the polymer solution containing the peroxide is heated under reduced pressure to remove the solvent and to promote crosslinking of the polymer by the peroxide. The product remaining after removal of the solvent is stored and used as needed. Viscous and solid polymers are converted to rubbery, elastic solids by crosslinking in this manner. Crosslinking is also effected by other means such as exposure of the polymer to ionizing radiation, such as X-rays and gamma rays. Sulfur and other vulcanizing agents are used in crosslinking some polymers.

In the practice of my invention, from about 10 parts to about 90 parts by weight of the polymeric gelling agent, preferably crosslinked polymer, is mixed with from about 90 parts to about 10 parts by weight of the nitroalkane. Preferably, from 25 to 15 parts by weight of the polymer, preferably crosslinked polymer, is used with 75 to 85 parts by weight of the nitroalkanes. Gelation of the nitroalkanes is produced by contacting the polymer, preferably crosslinked polymer, with the nitroalkanes. Gel formation is accelerated by suitable mixing of the two materials, as, for example, when a piston-type plunger is used to force the materials through an orifice.

To incorporate propellant modifiers, such as the types mentioned hereinabove, the modifiers or additives are, if desired, dispersed in the gelled mixture of polymer, preferably crosslinked polymer, and nitroalkane, or they are mixed with the polymer, with the nitroalkane, or part with the polymer and part with the nitroalkane. In one instance, powdered aluminum is dispersed in the nitroalkane and the mixture then blended with the crosslinked polymer. Any excess nitroalkane used during blending is subsequently removed by evaporation or by distillation.

The so-prepared gelled composition is suitable for use as a gas generator and particularly as a rocket propellant. This composition is ignited by a hot wire, or by other suitable means, and burned.

Specific impulse is about 270 lb.-sec. per lb. for a propellant comprising 75 weight percent tetranitromethane and 25 weight percent crosslinked poly methyl vinyl ether. Specific impulse is defined as the pounds of thrust per pound mass flow of propellant per second.

*Example I*

A propellant composition was prepared having the following composition:

Parts by weight
Crosslinked poly methyl vinyl ether _____ 10
Tetranitromethane _____ 90

This crosslinked polymer was prepared from poly methyl vinyl ether (50 g.) which was first dissolved in benzene (200 g.). The solution was mixed with dicumyl peroxide (1.5 g.). The benzene was removed while mixing at a reduced pressure (below 10 mm. Hg absolute pressure). When the solvent had distilled under this reduced pressure, nitrogen was passed continuously through the mixer and the mixer and contents were heated by passing steam at 160 p.s.i.g. through the jacket of the mixer. Mixing was continued for about 1½ hours with the heating. Heating was then discontinued but the nitrogen gas was continually passed through the mixer until the product cooled to room temperature (20–25° C.). The product was a black, elastic material which was stored in a covered glass jar. This material was designated as the peroxide treated (crosslinked) polymer. It was blended with tetranitromethane in the following manner.

The peroxide treated polymer (9.0 grams) was placed in a 100 ml. steel syringe having a design analogous to those used by the medical profession. This syringe was joined tip-to-tip by means of a small connecting tube with a second 100 ml. syringe which contained tetranitromethane (48.5 ml.). By movement of the plungers the tetranitromethane was transferred to the syringe containing the polymer. The mixture remained in the syringes overnight. The next morning, mixing was continued for two hours. Mixing was effected by means of a motor driven device which moved the plungers in both syringes simultaneously at a rate of about two complete strokes a minute. The resulting mixture was a viscous gel.

Portions of the propellant composition were expelled from one of the syringes into glass cups 5 mm. in diameter and about 13 mm. deep. The samples in the glass cups were burned in a bomb at room temperature (20–25° C.) and in the presence of nitrogen gas at pressures covering the range from 300 to 1500 p.s.i.g. Burning of the sample was initiated by means of an igniter wire. Burning was indicated by an optical system comprising a lead sulfide cell in one arm of a Wheatstone bridge. As the propellant burned, the rays passed through a quartz window in the bomb and onto the lead sulfide cell. A recording was made of the infrared intensity registered by the cell as a function of time. This recording clearly indicated the duration of the burning and was used to compute the burning rate. A graph of the burning rate, $r$, versus pressure was prepared and a smooth curve drawn to represent the results and by interpolation to obtain the burning rate at 600 p.s.i.g. This result is tabulated below together with the pressure exponent, $n$, of the burning rate equation, $r = ap_c^n$, where $r$ is the burning rate, in./sec.; $a$ is a constant; $p_c$ is the pressure p.s.i.a. in the combustion chamber; and $n$ is the burning rate exponent. The lower the value of $n$, the less sensitive the burning rate to changes in pressure.

$r$ at 600 p.s.i.g. inches/second _____ 1.2
$n$ at 600 p.s.i.g. _____ 1.34

The propellant composition burned smoothly in the glass cups and left little or no residue.

*Example II*

A commercial sample of poly methyl vinyl ether was obtained which was a balsam-like liquid and very tacky when touched. 1.55 grams of this material was placed in an aluminum dish having a diameter of about 10 cm. 5.0 grams of tetranitromethane was added to the dish which was then put aside for 24 hours at room temperature (20–25° C.). A firm gel was formed by diffusion mixing. The product weighed 3.04 grams representing 51 percent by weight of the polymer and 49 percent of the tetranitromethane, the remainder of the tetranitromethane having evaporated. The gel was sufficiently firm so that when contained in the inverted dish one would not observe flow in a 5-minute period indicating formation of a rigid gel.

A product which represents a uniform mixture of 20 parts of the commercial sample of polymer and 80 parts by weight of the tetranitromethane flows readily. These observations show that the crosslinked polymer is more effective in forming a gel with the nitroalkane than the noncrosslinked polymer. When using a noncrosslinked polymer a greater proportion is required to produce a suitable gel with a nitroalkane than when using a crosslinked polymer.

One important embodiment of this invention involves placing the gelled propellant composition in a porous or cellular structure thereby permitting its use in a manner analogous to that of solid propellant compositions. When the gelled propellant is encased in a cellular structure, the structure reinforces and supports the gel. When the cellular structure is made of metallic aluminum, magnesium or the like, the metal serves as an additional fuel and, furthermore, it increases the burning rate of the propellant.

Other gelled propellant compositions are also placed in the herein disclosed porous or cellular structures in the same manner and for the same reason as the herein disclosed, gelled propellant composition.

The cellular structures which are used in the practice of this invention are metallic and nonmetallic structures which serve as containers for the gel. The structures also serve as a fuel and are considered a part of the propellant composition; and they contribute to structural rigidty of the propellant. The high strength of the cellular structures herein described permits use of these gelled or semi-liquid propellants in rockets and other gas generating devices with a concomitant reduction in dead weight. By dead weight is meant the weight of members which are not fuel and which contribute to structural rigidity. The case and conventional reinforcing members are examples of dead weight. In some cases, these cellular structures are used to fabricate an essentially "caseless" rocket. The outside layer of the cellular structures serves as a mechanical protector for these caseless rockets, or a layer of thin metal or other material bonded to the exterior of the cellular structure serves as a mechanical protector in some instances.

Metals which are used in the form of foils and sheets to fabricate cellular structures include aluminum, magnesium, titanium and beryllium. These and other metals are used as alloys such as alloys of aluminum with magnesium, aluminum with boron, aluminum with lithium and magnesium, copper with zinc, iron with chromium, iron with nickel, silver with copper, and the like. Of these, the light metals and alloys comprising a major portion of the light metals such as aluminum and magnesium are frequently preferred.

Figure 11:
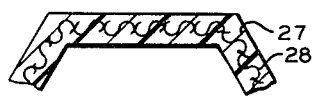
FIGURE 11 illustrates a hexagonal cell unit of reinforced plastic impregnated cloth.
Figure 12:
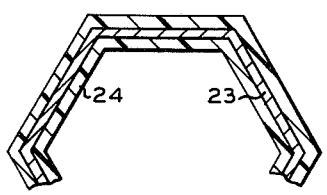
FIGURE 12 illustrates a plastic coated metallic cell wall.
Figure 13:
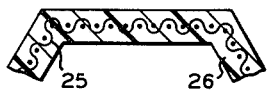
FIGURE 13 illustrates plastic coated screen cell wall.

Nonmetallic cellular structures are also fabricated and used in the practice of this invention. For example, various polymeric materials are used alone or with nonmetallic reinforcing materials such as silica, glass, asbestos and cloth (cotton, silk, linen, wools, hair, etc.). FIGURE 11 illustrates a cell wall of cloth 28 impregnated with a combustible plastic 27. It is within the scope of this invention to use cellular structures which are partly of metal and partly of nonmetal. For example, the metal structures are in some instances coated with thermosetting plastics, as illustrated in FIGURE 12, in which a metallic cell wall 23 is coated with combustible plastic or thermosetting coating 24. Cellular structures fabricated with polymeric materials are, if desired, reinforced with metal wires, screens, and the like, as illustrated in FIGURE 13 in which a metal screen cell wall 25 is impregnated with a combustible plastic or thermosetting resin 26. Such plastic and thermosetting resins used herein as coating 24, plastic 26, and plastic 27 are described in a copending application, Serial No. 796,170, filed February 27, 1959.

This plastic and thermosetting material comprises homopolymers and copolymers of 1-olefins such as polyethylene, polypropylene, and the copolymers of ethylene and propylene, and liquid and rubbery polymers of conjugated dienes such as 1,3-butadiene, isoprene, and the like, and the copolymers of these dienes with other copolymerizable monomers. Examples of such liquid and rubbery polymers include liquid polybutadiene, and rubbery copolymers of 1,3-butadiene with styrene, with 2-vinylpyridine, and with 2-methyl-5-vinylpyridine. Epoxy-containing polymers such as epoxidized polybutadiene and the well-known Epon resins, which are condensation polymers of epichlorohydrin and bisphenol-A, phenol-formaldehyde polymers and other related condensation products are also used.

As an example of the use of a resin or plastic material for reinforcing a cloth in the production of cellular material, several layers of cloth are joined by sewing or cementing along parallel lines spaced about 0.1 to 1.0 inch apart. The sewed cloth is then immersed in a liquid polymer containing a curing agent for a time sufficient to saturate the fabric. The saturated fabric is then expanded to produce a cellular structure. The expanded structure is then cured to convert the liquid polymer to a solid and the fabric is thereby reinforced. Such procedure is fully disclosed in the above-mentioned copending application, Serial No. 796,170, filed February 27, 1959.

Suitable cellular structures are commercial available. For example, structures comprising cells having hexagonal cross sections are available. These structures are fabricated from aluminum alloys and resin-reinforced glass fabric. Typical cellular structures are illustrated in FIGURES 4 to 9, inclusive.

Figure 4:
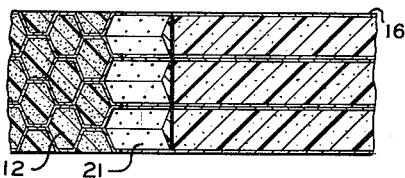
FIGURE 4 illustrates a hexagonal cross section cell structure.
Figure 5:
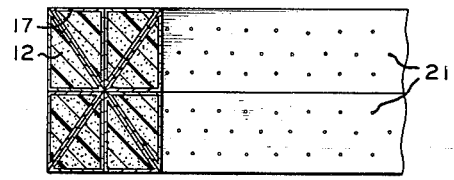
FIGURE 5 illustrates a triangular cross section cell structure.
Figure 6:
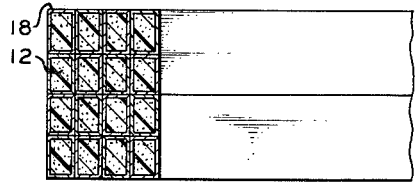
FIGURE 6 illustrates a right angled parallelogram cross section cell structure.
Figure 7:
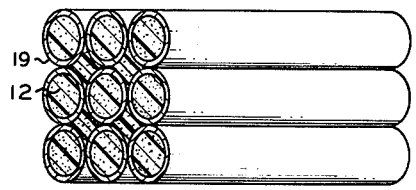
FIGURE 7 illustrates a circular cross section cell structure of cubic packing.
Figure 8:
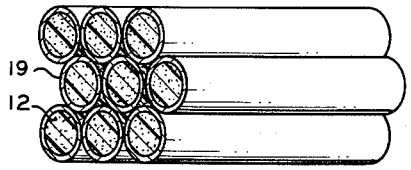
FIGURE 8 illustrates a circular cross section cell structure of hexagonal packing.
Figure 9:
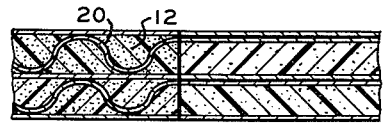
FIGURE 9 illustrates a cell structure unit having a corrugated longitudinal section.

In these figures, FIGURE 4 illustrates hexagonal units 16, FIGURE 5 illustrates triangular units 17, FIGURE 6 illustrates right angled parallelogram units 18 (square units as well as rectangular units are used), FIGURE 7 illustrates circular units 19 with cubic packing, FIGURE 8 represents circular units 19 of hexagonal packing, and FIGURE 9 represents units 20 produced by corrugations. Each configuration is illustrated as being filled with gelled propellant 12. In FIGURES 7 and 8, propellant is placed between the circular units as well as within them.

The unit (individual) cells comprising the cellular structure have preferably a cross-sectional area on the order of 0.003 to 0.5 square inch, but cells having smaller (e.g. 0.001 square inch) and larger (e.g. 1.0 to 2.0 square inches) areas are used. With a given type of unit cell, the wall thickness is varied to suit circumstances. Commonly, the wall thickness varies from 0.001 inch to 0.003 inch and is chosen to give the desired structural rigidity and/or the necessary amount of fuel. Generally, the unit cell dimensions are selected so as to provide from about 1 to about 50 parts by weight of the cellular structure for each 100 parts of propellant which fills the unit cells.

The following tabulation illustrates how cell size and wall thickness affects the apparent density of cell structures fabricated with aluminum and having cells with a hexagonal cross-section as shown in FIGURE 1. The tabulation also gives the approximate volume percent of aluminum.

| Cell Size [1] | | Wall Thickness, Inches | Density, lb./cu.ft. | Metal, Volume Percent |
|---|---|---|---|---|
| Square Inches | Inches | | | |
| 0.0135 | 1/8 | 0.001 | 4.5 | 2.7 |
| 0.0135 | 1/8 | 0.002 | 8.1 | 4.8 |
| 0.030 | 3/16 | 0.001 | 3.1 | 1.8 |
| 0.030 | 3/16 | 0.002 | 5.7 | 3.4 |
| 0.054 | 1/4 | 0.001 | 2.3 | 1.4 |
| 0.054 | 1/4 | 0.003 | 6.0 | 3.6 |
| 0.12 | 3/8 | 0.002 | 3.0 | 1.8 |
| 0.12 | 3/8 | 0.003 | 4.2 | 2.5 |

[1] Cross-sectional area and distance between parallel faces are given.

In some cases, pinholes 21 and other perforations are made in the cell walls so as to provide communication for fluids between cells. The length of or height of the cells is varied as desired. Generally, it is preferred to use cells at least about 0.5 inch in length, and cells having a length of many feet, e.g., 10 to 100 feet and even longer, are employed. As far as is now know, the maximum permissible length is dictated by the length of the rocket or by practical considerations. To circumvent difficulty with handling long structures, short structures are usually used and a sufficient number of them is joined to give the length desired.

In the practice of this invention these structures are filled with the gel propellant composition. This is accomplished, for example, by immersing the cellular structure in a container (e.g., rocket case) filled with the gel. The gel, in some cases, is injected into the cells previously disposed in the rocket cases with due precaution to minimize trapping of gas.

In still another embodiment of this invention the gel structure is generated in situ. For example, the cells are partially filled with a gelling agent and a liquid oxidizer is added to fill completely the cells. The oxidizer swells the gelling agent and a gel filling the cells is formed in situ.

These structures when filled with propellant are highly useful as gas generators and particularly as rocket motors.

The practice of this invention is demonstrated by the following examples:

*Example III*

A quantity of gelled propellant was prepared as disclosed in Example I.

Several three-cell aluminum structures (FIGURE 10) were prepared using a commercial aluminum cellular product. This product consisted of cells having hexagonal cross-sections with opposite faces approximately 3/16 inch apart. Foil from which the cells were made was an aluminum alloy (3003) having a thickness of 0.002 inch. The foil was perforated. The perforations were approximately 1/4 inch apart. The cells were believed made by cementing of sheets of foil since each cell had two opposite sides with a thickness twice that of the remaining four sides.

Figure 10:
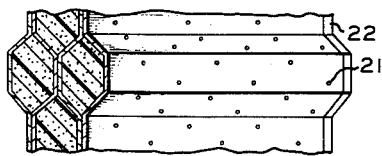
FIGURE 10 illustrates a 3 cell hexagonal cell unit.

A unit was taken consisting of three hexagonal cells having a cross-section illustrated in FIGURE 10. The axial length of the cells was approximately 0.8 inch. The three-cell units were cemented with an epoxy adhesive (Epon VI) onto a sheet of plastic 22 (Plexiglas, 0.03 inch thick) so as to close one end of each cell. When filled with propellant, the aluminum cell walls represented approximately 12 percent of the total weight (metal plus gel), not including the plastic base.

Portions of the propellant composition were expelled into glass cups 5 mm. in diameter and about 13 mm. deep as well as into several of the three-cell hexagonal units. The samples in glass and in the aluminum were separately burned in a bomb at room temperature (20–25° C.) and at pressures covering the range from 300 to 1500 p.s.i.g. The bomb, the burning detection system and the operation are as set forth in Example I. A recording was made of the infrared intensity registered by the lead sulfide cell as a function of time. This recording clearly indicated the duration of the burning and was used to compute the burning rate. Graphs of the burning rate, $r$, versus pressure were prepared and a smooth curve drawn to represent the results and to obtain the burning rate at 600 p.s.i.g. These results together with the pressure exponent, $n$, of the burning rate equation, $r = a p_c^n$, are given in the tabulation below:

| | Glass Cup | Aluminum Cellular Container |
|---|---|---|
| $r$ at 600 p.s.i., in./sec. | 1.2 | 3.1 |
| $n$ at 600 p.s.i. | 1.34 | 0.96 |

These results indicate that the propellant in the aluminum cellular structure burned at a rate of 2.6

(3.1/1.2=2.6)

times as fast as the propellant in the glass cup. Thus the aluminum cellular material improved, i.e., increased the burning rate of the propellant.

The lower value for n obtained with the cellular structure is also favorable since it is generally desired to use propellants having a low value for the pressure exponent.

Observation of the residues left from burning the propellant contained in the aluminum cells revealed that the interior cell walls, i.e., walls which had propellant on both sides, were essentially consumed. The exterior walls were partially consumed. For the various runs which were made, the weight percent of the aluminum which was burned was found to be about 34 percent.

*Example IV*

Propellant of the same composition as described in Example I was used to fill glass cups of the size as given in Example I. In each glass cup there was immersed a single aluminum cell of the type described. Each aluminum cell was approximately 0.5 inch in length.

These cells with propellant were burned in the bomb at room temperature and at pressures covering the range from 300 to 1500 p.s.i.g. From these runs, the burning rate at 600 p.s.i.g. was found to be 2.6 inches/second. The pressure exponent, n, at 600 p.s.i.g. was 2.05. Under these conditions the aluminum cells were completely consumed. This result, together with the results of Example III, emphasizes that the aluminum cells are burned as fuel particularly when each cell is completely surrounded by the propellant composition. A multicell structure accomplishes this and also contributes to strength.

*Example V*

A propellant composition was prepared using the following ingredients:

| | Parts by weight |
|---|---|
| Crosslinked polymer (Example III) | 10 |
| Tetranitromethane | 90 |
| Aluminum powder | 8.5 |

In this case, the aluminum powder which had an average size of 6 microns was placed with the polymer in one glass syringe. The tetranitromethane was contained in the second glass syringe. Otherwise, the mixing procedure was substantially the same as described for Example I.

The viscous gelled composition was extruded into single hexagonal cells having dimensions as described in Example III. The weight percent of the cell was approximately 12 percent of the total weight (cell plus propellant). The burning rate and the pressure exponent at 600 p.s.i.g. were found to be $r=2.48$ inches/second, $n=1.48$.

A copending application, hereinabove referred to, discloses preparation of resin and plastic reinforced combustible materials such as cloth, and other materials such as glass fabric, which are suitable for support of gelled propellant material as herein disclosed.

Figure 2:
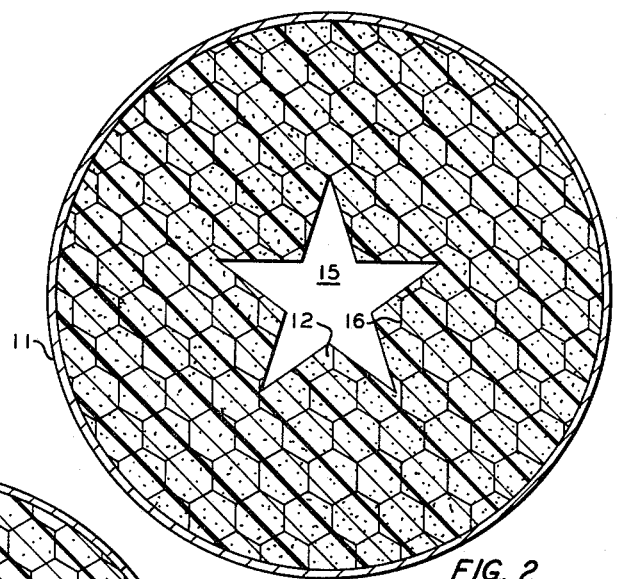
FIGURE 2 is a sectional view taken on the line 2—2 of FIGURE 1.
Figure 3:
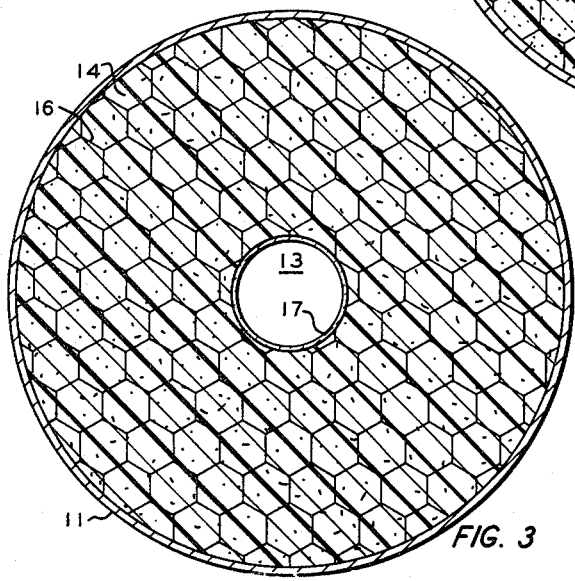
FIGURE 3 is a sectional view taken on the line 3—3 of FIGURE 1.

In FIGURES 1, 2 and 3 of the drawing, reference numeral 11 identifies a rocket case in which is disposed a cellular gelled propellant as herein disclosed. Reference numeral 12 identifies the gelled propellant disposed in hexagonal, honeycomb cells. Opening 15 extends most of the length of the propellant to provide burning surface. The main body of propellant 12 having opening 15 is generally a fast burning propellant while the propellant 14 defining the nozzle opening 13 is a slow burning propellant. A liner 17a is used, if desired, as an erosion protector for the nozzle propellant. The liner will need be made of such a metal as will withstand high temperatures. The composition of the propellant 14 in the nozzle is, if desired, the same as the composition of the main propellant 12. In FIGURE 1, reference symbols 16a identify the metallic cell walls.

FIGURE 2 is a cross-sectional view of the rocket taken on the line 2—2 of FIGURE 1, and shows the star-shaped combustion surface forming opening 15. FIGURE 3 is a cross-sectional view of the nozzle section of the rocket taken on the line 3—3 of FIGURE 1. FIGURES 2 and 3 illustrate the honeycomb form of the cellular structure containing the gelled propellant.

While certain embodiments of the invention have been described for illustrative purposes, the invention obviously is not limited thereto.

I claim:

1. A composition of matter consisting essentially of a mixture of about 10 parts to about 90 parts by weight of a crosslinked polymer of an alkyl vinyl ether in which the alkyl group contains from 1 to 4 carbon atoms per alkyl group, with from about 90 parts to about 10 parts by weight of a nitroalkane, which contains from 1 to 4 carbon atoms per molecule.

2. A composition of matter consisting essentially of a mixture of about 10 parts to about 90 parts by weight of a crosslinked polymer of an alkyl vinyl ether, which, prior to crosslinking, has the general formula

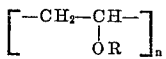

in which $n$ is from 3 to about 35,000, and R is an alkyl group having from 1 to 4 carbon atoms per alkyl group, with from about 90 parts to about 10 parts by weight of a nitroalkane, which contains from 1 to 4 carbon atoms per molecule.

3. A composition of matter consisting essentially of a mixture of about 25 parts to about 15 parts by weight of a crosslinked polymer of an alkyl vinyl ether, which prior to crosslinking, has the general formula

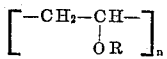

in which $n$ is from 3 to about 35,000, and R is an alkyl group having from 1 to 4 carbon atoms per alkyl group, with from about 75 parts to about 85 parts by weight of a nitroalkane, which contains from 1 to 4 carbon atoms per molecule.

4. The composition of claim 1 wherein said polymer is a polymer of methyl vinyl ether and said nitroalkane is tetranitromethane.

5. The composition of claim 1 wherein the polymer is a polymer of ethyl vinyl ether and said nitroalkane is tetranitromethane.

6. The composition of claim 1 wherein said polymer is a copolymer of methyl vinyl ether and 1,3-butadiene.

7. The composition of claim 1 wherein said polymer is a copolymer of ethyl vinyl ether and acrylonitrile.

8. The composition of claim 1 wherein said polymer is a copolymer of n-butyl vinyl ether and methyl acrylate.

9. The composition of claim 1 wherein said crosslinked polymer of an vinyl ether is an organic peroxide crosslinked polymer of an alkyl vinyl ether.

10. The composition of claim 1 wherein said composition further includes a metal powder, said metal powder being present in the final composition in an amount less than about 25 percent by weight of the composition.

11. The composition of claim 10 wherein said metal powder is aluminum powder.

12. The composition of claim 10 wherein said metal powder is magnesium powder.

13. A composition of matter consisting essentially of a mixture of about 10 parts to about 90 parts by weight of a polymer of an alkyl vinyl ether in which the alkyl group contains from 1 to 4 carbon atoms per alkyl group, with from about 90 parts to about 10 parts by weight of a nitroalkane, which contains from 1 to 4 carbon atoms per molecule.

14. The composition of claim 13 wherein said composition further includes a metal powder, said metal powder being present in the final composition in an amount less than about 25 percent by weight of the composition.

15. The composition of claim 14 wherein said metal powder is aluminum powder.

16. The composition of claim 14 wherein said metal powder is magnesium powder.

References Cited in the file of this patent

UNITED STATES PATENTS

| | | |
|---|---|---|
| 552,919 | Maxim | Jan. 14, 1896 |
| 726,901 | Gathmann | May 5, 1903 |
| 2,744,816 | Hutchison | May 8, 1956 |
| 2,783,138 | Parsons | Feb. 26, 1957 |

UNITED STATES PATENT OFFICE
CERTIFICATE OF CORRECTION

Patent No. 3,035,950                                                May 22, 1962

Claude G. Long

It is hereby certified that error appears in the above numbered patent requiring correction and that the said Letters Patent should read as corrected below.

Column 10, line 60, before "vinyl" insert -- alkyl --.

Signed and sealed this 2nd day of October 1962.

(SEAL)
Attest:

ERNEST W. SWIDER
Attesting Officer

DAVID L. LADD
Commissioner of Patents